(12) United States Patent
Shindo et al.

(10) Patent No.: US 8,351,098 B2
(45) Date of Patent: Jan. 8, 2013

(54) IMAGE PROCESSING APPARATUS, IMAGE FORMING APPARATUS, METHODS OF CONTROLLING IMAGE PROCESSING APPARATUS AND IMAGE FORMING APPARATUS TO RECONSTRUCT AN ELECTRONIC COLOR IMAGE FROM A PRINTED COLOR IMAGE

(75) Inventors: Yukihiro Shindo, Kawasaki (JP); Yukichika Ichihashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1202 days.

(21) Appl. No.: 12/179,328

(22) Filed: Jul. 24, 2008

(65) Prior Publication Data
US 2009/0034011 A1 Feb. 5, 2009

(30) Foreign Application Priority Data

Jul. 31, 2007 (JP) ................................ 2007-198949

(51) Int. Cl.
*G03F 3/08* (2006.01)
*H04N 1/60* (2006.01)
*H04N 1/40* (2006.01)
*G06K 9/00* (2006.01)

(52) U.S. Cl. ........ 358/518; 358/520; 358/1.9; 358/3.28; 382/167

(58) Field of Classification Search ........................ None
See application file for complete search history.

(56) References Cited

U.S. PATENT DOCUMENTS

| | | | | |
|---|---|---|---|---|
| 6,304,345 | B1 * | 10/2001 | Patton et al. | 358/527 |
| 6,351,558 | B1 * | 2/2002 | Kuwata | 382/168 |
| 6,439,465 | B1 * | 8/2002 | Bloomberg | 235/494 |
| 6,956,958 | B2 * | 10/2005 | Fan et al. | 382/100 |
| 7,154,557 | B2 * | 12/2006 | Itoh et al. | 348/453 |
| 2002/0097409 | A1 * | 7/2002 | Wexler et al. | 358/1.9 |
| 2003/0223634 | A1 * | 12/2003 | Gallagher et al. | 382/167 |
| 2006/0103861 | A1 * | 5/2006 | Klassen et al. | 358/1.9 |
| 2007/0165257 | A1 * | 7/2007 | Owaku | 358/1.9 |

FOREIGN PATENT DOCUMENTS

| | | | |
|---|---|---|---|
| JP | 0579224 A1 * | 1/1994 |
| JP | 06-038032 | * | 2/1994 |
| JP | 08-279896 A | | 10/1996 |
| JP | 10-126607 A | | 5/1998 |
| JP | 11-032205 A | | 2/1999 |
| JP | 2007-142986 A | | 6/2007 |
| JP | 2008-072254 A | | 3/2008 |

\* cited by examiner

*Primary Examiner* — David K Moore
*Assistant Examiner* — Peter L Cheng
(74) *Attorney, Agent, or Firm* — Canon U.S.A, Inc. IP Division

(57) ABSTRACT

A color printed image with compressed colors produced by printing an electronic color image is reconstructed into an electronic color image similar to an original color image by using digital watermark image data with a reduced data size. The digital watermark image data is produced using color difference data of the color image data including luminance data and the color difference data. The digital watermark image data either does not include luminance data or includes luminance data with a data size reduced at a very large ratio.

3 Claims, 11 Drawing Sheets

IMAGE PROCESSING APPARATUS, IMAGE FORMING APPARATUS, METHODS OF CONTROLLING IMAGE PROCESSING APPARATUS AND IMAGE FORMING APPARATUS TO RECONSTRUCT AN ELECTRONIC COLOR IMAGE FROM A PRINTED COLOR IMAGE

BACKGROUND OF THE INVENTION

1. Field of the Invention

The present invention relates to an image processing apparatus adapted to reconstruct original color image data from a color printed matter obtained by printing according to color image data and a method for controlling the image processing apparatus.

2. Description of the Related Art

When color image data is printed to produce a color printed matter, the image quality of this color image data changes (degrades in most cases) during the printing process.

In fact, when color image data produced in a color gamut of an expanded RGB color space is printed, the color gamut of the color image on the printed matter is compressed to an RGB space within which a printing apparatus is capable of representing colors (that is, degradation in color occurs).

In view of the above, Japanese Patent Laid-Open No. 10-126607 discloses a technique for restoring color image data from color printed matter.

More specifically, Japanese Patent Laid-Open No. 10-126607 discloses a method of converting original color image data itself into a bar code and printing the bar code on paper. If this paper is scanned, the original color image data is read from the inside of the bar code and printed.

However, in the method disclosed in Japanese Patent Laid-Open No. 10-126607, it is necessary to convert color image data having a very large amount of information into a bar code. The result is an increase in the size of the bar code (which may be a 1-dimensional or 2-dimensional bar code).

For example, color image data of an image with 6 mega pixels of each of RGB colors taken by a digital camera has a data size of 18 Mbytes, while the data size of a bar code on an A4-size sheet is as small as about 1 Kbytes. The ratio is as great as 18000:1.

Thus, there is a need for a technique to reproduce beautiful color image data from a printed matter produced by printing the color image data and digital watermark image data in which information with low information content is embedded.

SUMMARY OF THE INVENTION

The present invention provides an image forming apparatus configured to process luminance data and color difference data of color image data including a first producing unit configured to produce digital watermark image data from the color difference data of the color image data including the luminance data and the color difference data, a second producing unit configured to produce a printed matter from the color image data and the digital watermark image data, wherein the color image data included in read image data obtained by reading the printed matter produced by the second producing unit is corrected according to the digital watermark image data included in the read image data.

The present invention also provides an image processing apparatus including an acquisition unit configured to acquire, from read image data including digital watermark image data produced using color difference data of color image data including luminance data and the color difference data, information in digital watermark image data in read image data, and a color determination unit configured to produce reconstructed color image data by correcting the color difference data of the read image data based on the information acquired by the acquisition unit.

Further features of the present invention will become apparent from the following description of exemplary embodiments with reference to the attached drawings.

DESCRIPTION OF THE EMBODIMENTS

First Embodiment

In a first embodiment, an image processing apparatus is disclosed which is configured to, when original color image data is printed in the form of a color printed matter, produce a bar code from color difference data of the color image data including luminance data and the color difference data and output the produced bar code representing color information. An image processing apparatus is also disclosed which is configured to read a color printed matter having a bar code including color difference data by using a document reading apparatus such as a scanner, and reconstruct color image data from the read data.

That is, in the present embodiment, not all color data but only color difference data of the color data is converted into a bar code thereby achieving a reduction in information content of the bar code.

Producing a Color Image Having Color Difference Data

First, a printing system is disclosed which includes an image processing apparatus, a reading apparatus, and a printing apparatus, for use in an environment in which color printing is performed using original color image data. The printing system is configured such that, of luminance data and color difference data included in the original color image data, the color difference data is converted into a bar code and output. In the present embodiment, the original color image data refers to color image data obtained by taking an image using a digital camera or obtained by scanning a silver-halide picture or the like using an image scanner.

The reading apparatus reads an original document or an original subject, and the reading apparatus produces RGB color image data. The produced RGB color image data is output to the image processing apparatus.

The image processing apparatus performs image processing on the RGB color image data received from the reading apparatus. CMYK image data obtained as a result of the image processing is output to the printing apparatus.

The printing apparatus outputs, on a sheet, the CMYK image data received from the image processing apparatus. In other words, the printing apparatus produces a printed matter from the CMYK image data received from the image processing apparatus.

In the following explanation, it is assumed by way of example that the image processing apparatus and the printing apparatus are separate apparatuses. However, these apparatuses may be configured in an integrated form in which the image processing apparatus and the printing apparatus are electrically connected to each other. When the image processing apparatus and the printing apparatus are integrated in a single apparatus, the single apparatus will be referred to as an image forming apparatus. Additionally, the image reading apparatus may also be integrated in the single apparatus. Such a single apparatus will also be referred to as an image forming apparatus.

Referring to FIGS. 1 to 4 and FIG. 7, an image processing apparatus is disclosed that is configured to convert color image data in the form of RGB color data produced by the reading apparatus into CMYK data and output the resultant CMYK data to the printing apparatus.

Processing units shown in FIGS. 1 to 4 and FIG. 7 are centrally controlled by a CPU disposed in the image processing apparatus. Programs that define processes to be performed by the respective processing units are stored in a storage medium (such as an HDD, a flash memory, a CD-ROM disk, a DVD disk, etc.) disposed in the image processing apparatus. The CPU sequentially reads the programs stored in the storage medium and centrally controls the processes performed by the respective processing units.

Figure 1:
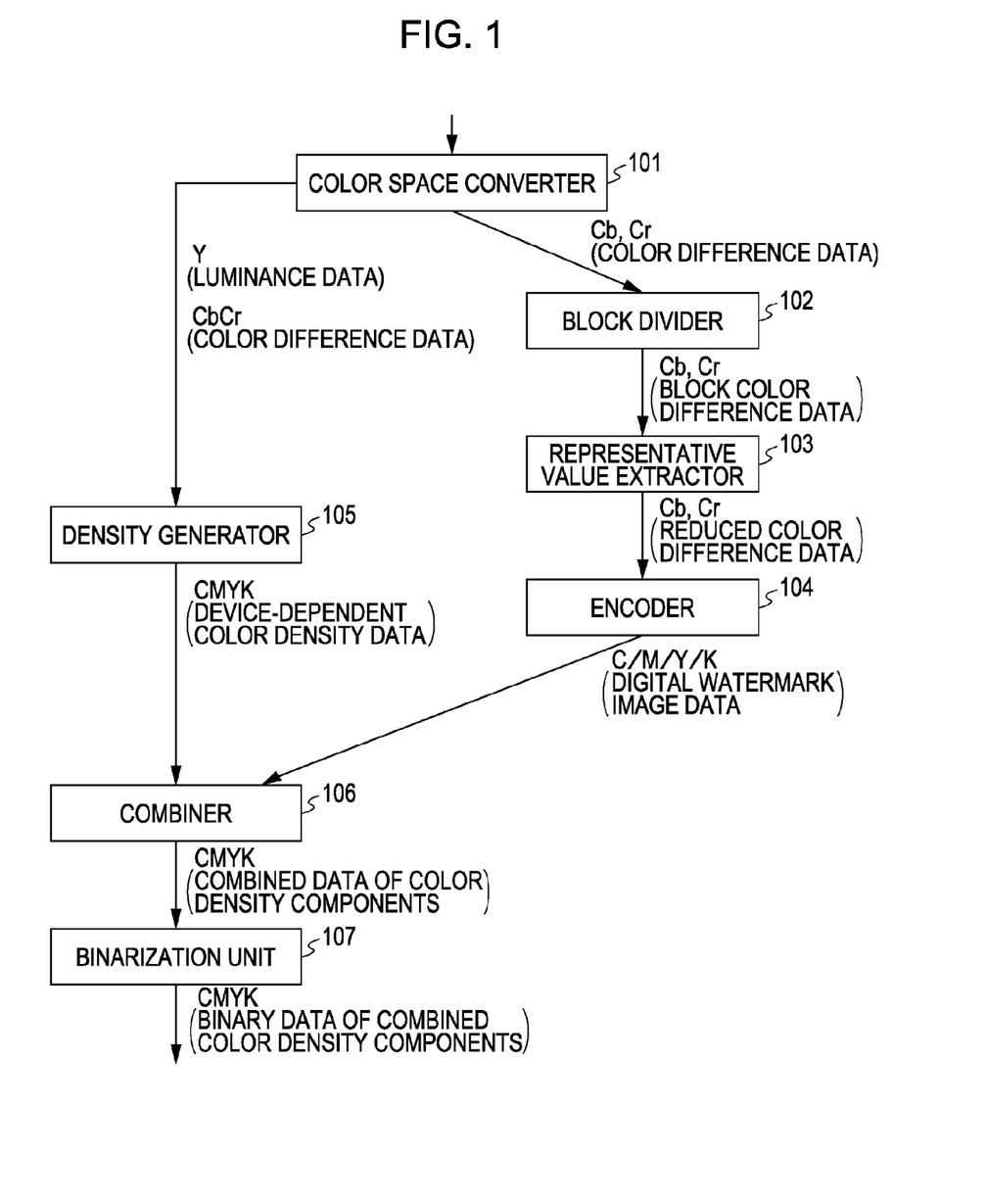
FIG. 1 is a diagram illustrating an image processing apparatus adapted to produce digital watermark image data.

FIG. 1 is a diagram illustrating an image processing apparatus adapted to produce digital watermark image data.

Process Performed by Color Space Converter 101

The color space converter 101 separates received color image data in the form of RGB color data into luminance data and color difference data. In the present invention, there is no particular restriction on a color space into which original color image data is separated, and YUV, LAB, YCbCr, or HSV may be employed as the color space. In the following explanation of the present embodiment, by way of example, it is assumed that the original color image data is separated into luminance data and color difference data in the YCbCr color space. In the present description, it is assumed that, before this color space conversion, apparatus-dependent image data is converted into apparatus-independent image data (by a known color matching technique).

In the present description, lightness L (in LAB), value V (in HSV), and luminance Y (in YUV or YCbCr) are generically denoted by "luminance". Cb and Cr in YCbCr, U and V in YUV, and A and B in LAB are generically denoted by "color difference". In the present invention, instead of color difference, H and S, which are generally called "hue" and "color saturation", may be employed.

As described above, the "luminance" is a term representing lightness, darkness, intensity, or brightness of color. On the other hand, the "color difference" is a term representing factors of color other than the darkness, the intensity, or the brightness.

The conversion between RGB data and YCbCr data can be performed according to the following conversion formulae, in which it is assumed that the dynamic range is 256, that is, each data is allowed to take a value in the range from 0 to 255.

$Y=0.29900*R+0.58700*G+0.11400*B$ $Cb=-0.16874*R-0.33126*G+0.50000*B+128$ $Cr=0.50000*R-0.41869*G-0.08131*B+128$ $R=Y+1.40200*(Cr-128)$ $G=Y-0.34414*(Cb-128)-0.71414*(Cr-128)$ $B=Y+1.77200*(Cb-128)$ $0 \leq R \leq 255$ $0 \leq Y \leq 255$ $0 \leq G \leq 255$ $0 \leq Cb \leq 255$ $0 \leq B \leq 255$ $0 \leq Cr \leq 255$ After the separation, the color space converter 101 outputs the color image data (the luminance data of the color image data and the color difference data of the color image data) to a density generator 105. The color space converter 101 also outputs the color difference data of the color image data to a block divider 102.

Block Divider 102

Figure 8:
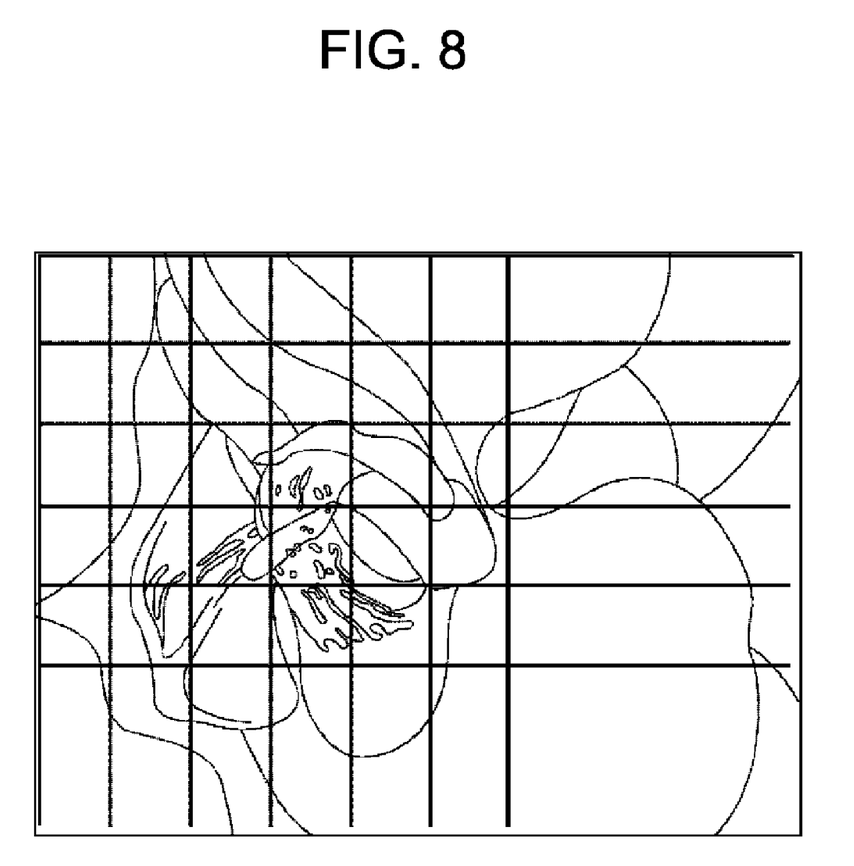
FIG. 8 is a diagram conceptually illustrating an image divided into unit blocks.

The block divider 102 divides the received color difference data into a plurality of unit blocks (each including, for example, 16 pixels×16 pixels (see FIG. 8)). After the division, the block divider 102 outputs block color difference data, including coordinate values corresponding to color difference data Cb, Cr in each block, to a representative value extractor 103. In the present description, the unit block may also be referred to as a predetermined-size block.

Representative Value Extractor 103

The representative value extractor 103 performs a data size reduction process on each of the plurality of received block color difference data thereby obtaining reduced-size color difference data. More specifically, the data size reduction process is performed as follows. First, the representative value extractor 103 extracts a representative value of each of the received block color difference data. Each representative value and coordinate values (from digital watermark image produced by an encoder 104) corresponding to the representative value are combined into a set and employed as the reduced-size color difference data. Instead of the set of coordinate values, the reduced-size color difference data may include data indicating the location of a first predetermined-size block, the unit block size, and numbers of unit blocks arranged in vertical and horizontal directions. The representative value extractor 103 outputs the reduced-size color difference data to the encoder 104.

The representative value of the block color difference data may be given, for example, by the average value $AVG_{ij}$ of the block color difference data, or may be given by a DC component and a low frequency component obtained by transforming the block color difference data into frequency components. Alternatively, the color difference value of a pixel on the upper left corner of each unit block of the block color difference data, or the color difference value of a pixel located in the center of each unit block may be used as the representative value. In any case, the representative value is a value representative of the color difference values of the block color difference data in each unit block.

Encoder 104

Figure 6:
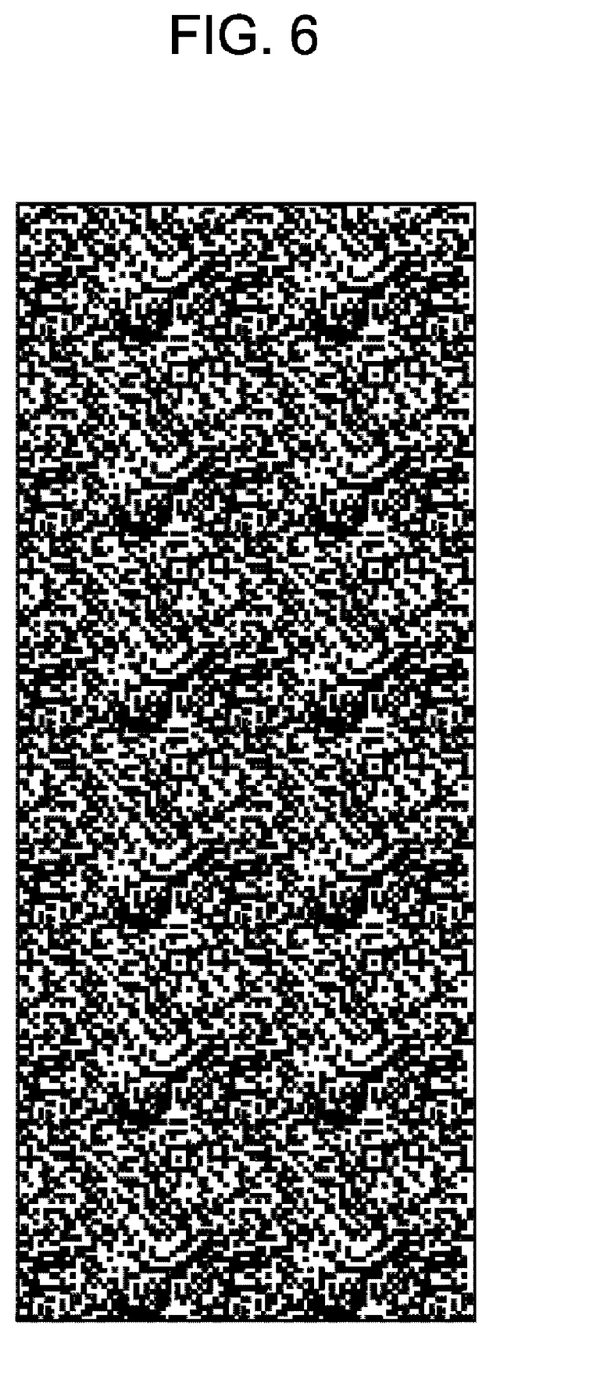
FIG. 6 is a diagram illustrating a digital watermark image.

The encoder 104 converts the data set received from the representative value extractor 103 into digital watermark image data. As a result, the set of the representative values (and the coordinate values corresponding to the respective representative values) is converted into image data in a machine-readable digital format. More specifically, for example, the conversion is performed so as to obtain known digital watermark image data (see FIG. 6). Note that, in the present description, the term "digital watermark" is used to describe an image including machine-readable data embedded therein, such as a 2-dimensional bar code, a 1-dimensional bar code, steganography, etc. Note that the machine-readable data is not readable directly by a person unless the data is read by a machine.

The digital watermark image data produced by the encoder 104 is represented in one of or two or more planes of cyan, magenta, yellow, and black.

The encoder outputs the produced digital watermark image data, as density component data, to a combiner 106.

Density Generator 105

The density generator 105 converts the luminance data and the color difference data received from the color space converter 101 into CMYK color density data, by using a profile. The profile is a table according to which input YCbCr data is uniquely converted to CMYK density data. The profile depends on what hues are represented by color materials of toner or ink used in the recording unit, and the color space of the density data is not limited to CMYK. Furthermore, the profile may also have a function of converting, by mapping, a device-dependent color space into a device-independent color space such as sRGB.

The density generator 105 outputs the resultant color density data to a combiner 106.

Combiner 106

The combiner 106 combines the color density data received from the density generator 105 and the digital watermark image data received from the encoder 104, in terms of density components. The combining is performed by a logical OR operation. After the combining is completed, the resultant combined color density component data is output to a binarization unit 107.

Figure 9:
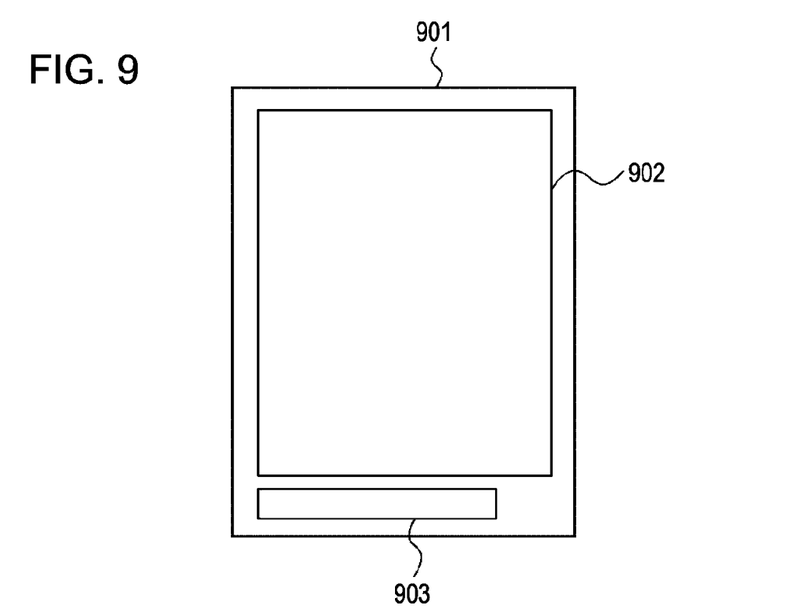
FIG. 9 is a diagram conceptually illustrating a printed image including a bar code.

In a case where the size of original color image data is smaller than a recording paper size, digital watermark image data may be printed in a marginal area outside color density data, for example, as shown in FIG. 9.

In a case where original color image data has a size similar to a recording paper size and there is no margin, digital watermark image data may be disposed on a page different from a page on which color density data is disposed (for example, printed overleaf or on a next page). Note that in the present description, the "combining" of digital watermark image data and color data includes the case where the digital watermark image data is disposed on a different page from a page on which the color density data is disposed.

Binarization Unit 107

The binarization unit 107 converts the combined data of color density components received from the combiner 106 into data with a format that can be used by a printing apparatus in printing (for example, 1-bit binary data). The obtained binary combined data of density components is output to the printing apparatus.

Figure 2:
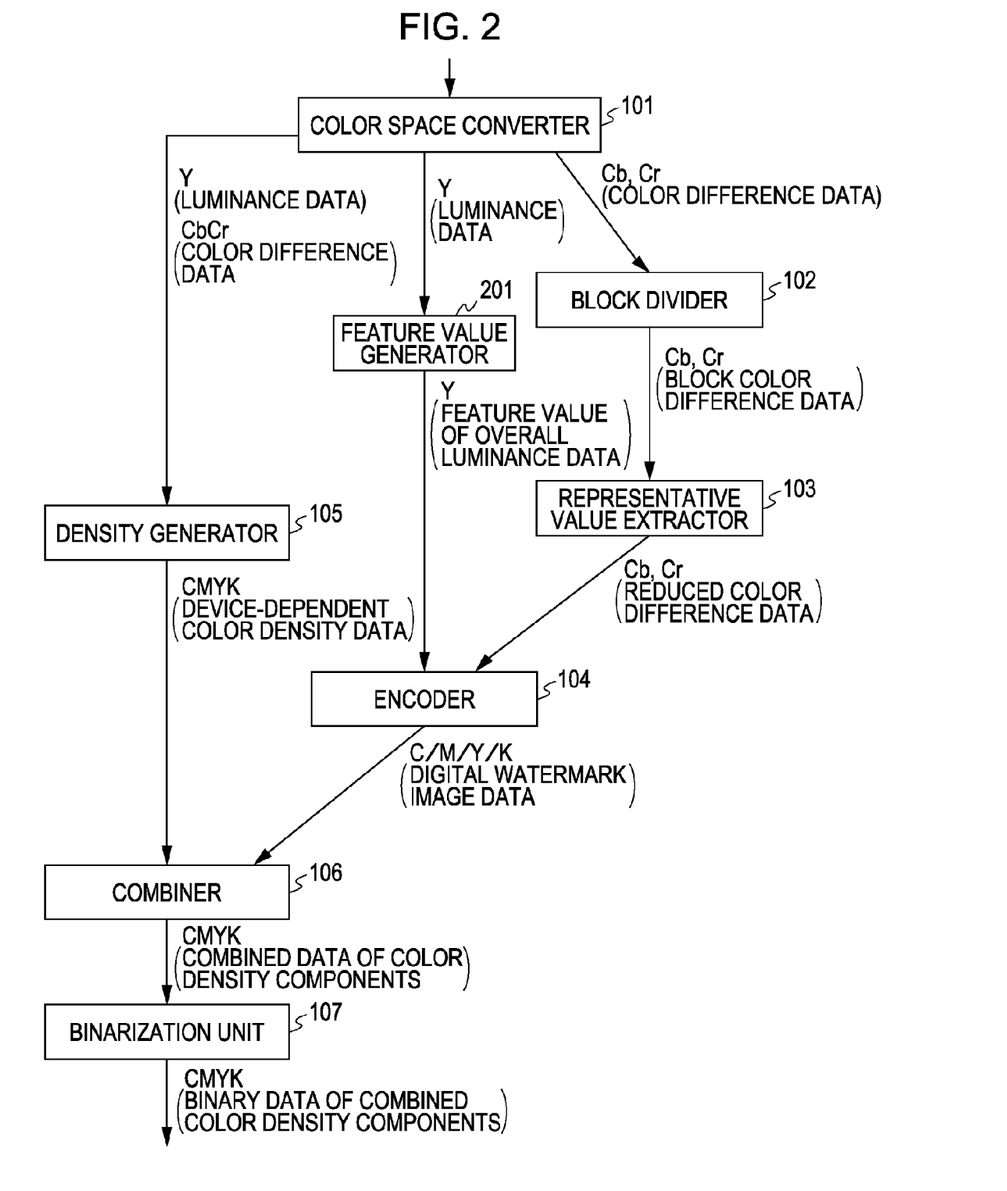
FIG. 2 is a diagram illustrating an image processing apparatus including a feature value generator.

FIG. 2 is a diagram illustrating an image processing apparatus including a feature value generator. In the image processing apparatus shown in FIG. 1, the encoder 104 receives only the color difference data output from the representative value extractor 103 but does not receive the luminance data from the color space converter 101.

In contrast, in the image processing apparatus shown in FIG. 2, the encoder 104 additionally receives, from the color space converter 101 via the feature value generator 201, the feature value of total luminance data obtained by reducing the data size of the luminance data at a very great reduction ratio.

In the following explanation of the image processing apparatus shown in FIG. 2, the explanation will focus on the color space converter 101, the feature value generator 201, and the encoder 104, which operate differently from those of the image processing apparatus shown in FIG. 1.

Process Performed by Color Space Converter 101

The color space converter 101 in FIG. 2 performs, in addition to the process performed by the color space converter 101 shown in FIG. 1, a process of providing luminance data of the color image data to the feature value generator 201.

Process Performed by Feature Value Generator 201

The feature value generator 201 shown in FIG. 2 produces a histogram of all received luminance data and extracts feature values of the produced histogram. In the present embodiment, by way of example, the feature values are given by luminance V1 and V2 (see FIG. 5) at upper and lower ends of the noise-eliminated histogram. Note that the feature values may be given differently. For example, the entire histogram may be employed as the feature values, or the feature values may be given by a luminance value of one or more peaks of the histogram and luminance values (V1 and V2) of upper and lower ends of the histogram. In the present embodiment, for simplicity of explanation, the luminance values at the upper and lower ends of the histogram are employed as the feature values. As can be understood from the above explanation, the feature value of data refers to a statistical value of whole given data.

Figure 5:
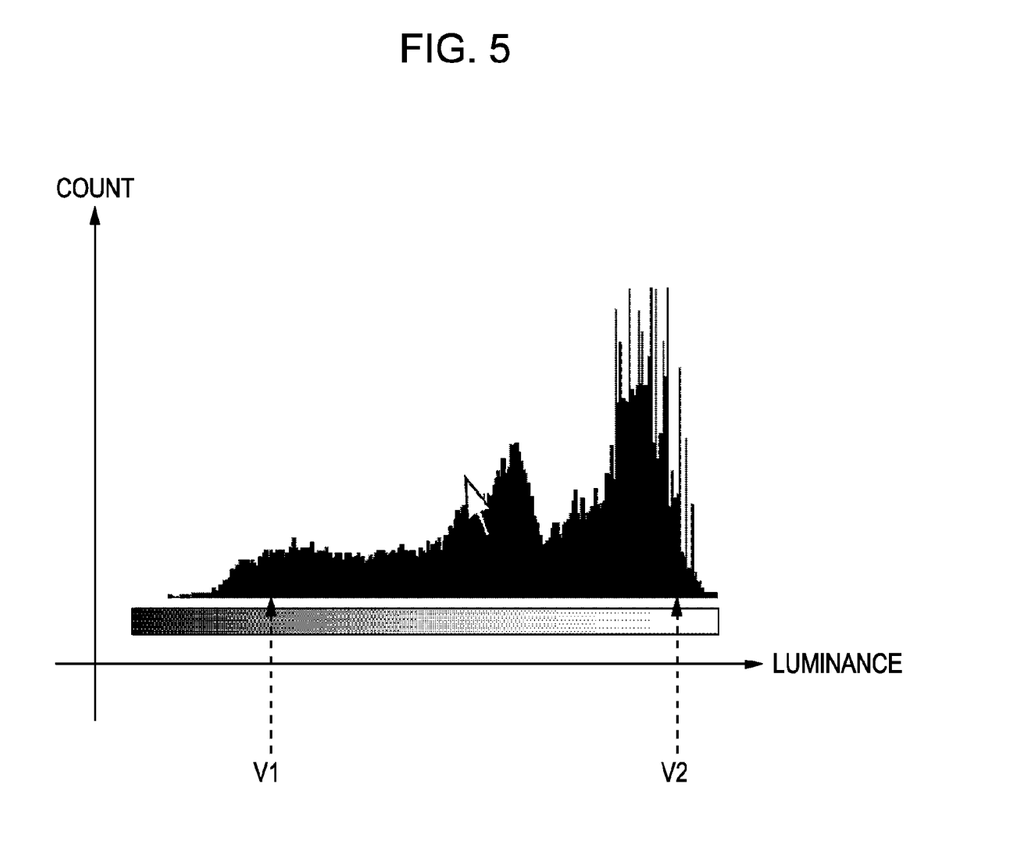
FIG. 5 is a diagram illustrating a histogram.

In the present embodiment, luminance in a 3% range on the low end and luminance in a 3% range on the upper end of the histogram are defined as noise. Thus, V1 is the lowest luminance value excluding the noise, and V2 is the highest luminance value excluding the noise.

FIG. 5 shows the histogram of the entire luminance data produced by the feature value generator 201, where a horizontal axis represents luminance and a vertical axis represents counts.

If the process described above is completed, the feature value generator 201 outputs the feature values associated with the overall produced luminance data to the encoder 104.

Process Performed by Encoder 104

The encoder 104 produces digital watermark image data of luminance components from the set of the representative values (and corresponding coordinate values) received from the representative value extractor 103 and the feature values of the overall luminance data received from the feature value generator 201.

As described above, unlike the image processing apparatus shown in FIG. 1, the image processing apparatus shown in FIG. 2 produces the digital watermark image data so as to include not only the reduced-size color difference data but also the feature values associated with the overall luminance data.

Note that the feature values associated with the entire luminance data are information produced on the basis of the histogram of the luminance data, and thus the information content thereof is much lower compared with the reduced-size color difference data. For example, in the present embodiment, the feature values associated with the overall luminance data are given by the luminance values at upper and lower ends of the histogram, and the information content thereof is as low as only 16 bits. More specifically, in this case, 8 bits are used to represent V1 (that can take a value from 0 to 255) and 8 bits for V2 (that can take a value from 0 to 255).

By incorporating the feature values of the entire luminance data into the digital watermark image data, as is the case with the image processing apparatus shown in FIG. 2, it becomes possible to obtain color image data more similar to the original color image data in the reconstruction process than can be by the image processing apparatus shown in FIG. 1.

Furthermore, unlike the digital watermark image data produced by the image processing apparatus shown in FIG. 1, the digital watermark image data produced by the image processing apparatus shown in FIG. 2 includes the feature values of the luminance data in addition to the color difference data. Because the feature values of the luminance data are data with a data size reduced at a very great ratio (and more specifically, with a data size as small as only 16 bits), the addition of the feature values of the luminance data has a very small influence on the total data size of the digital watermark image data.

Figure 3:
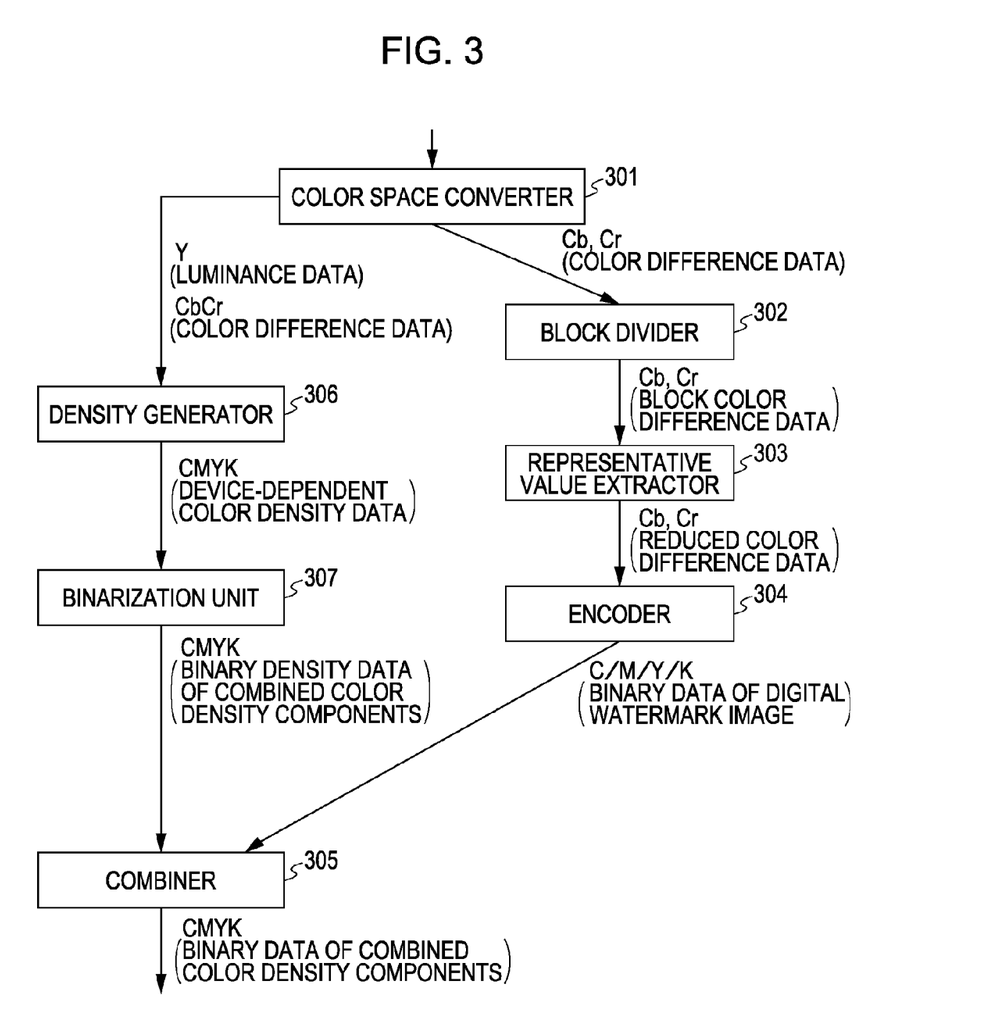
FIG. 3 is a diagram illustrating an image processing apparatus in which a density generator is disposed at a stage before a combiner.

FIG. 3 is a diagram illustrating an image processing apparatus in which a density generator is disposed at a stage before a combiner. In this image processing apparatus shown in FIG. 3, unlike the image processing apparatus shown in FIG. 1, the binarization unit 307 is located at a stage not after but before the combiner 305. The encoder 304 outputs digital watermark image data in the form of density component data to the combiner 305. That is, the image processing apparatus shown in FIG. 3 is basically similar to the image processing apparatus shown in FIG. 1. Thus, the following explanation will focus on differences of the image processing apparatus shown in FIG. 3 from the image processing apparatus shown in FIG. 1.

Process Performed by Color Space Converter 301

The color space converter 301 separates the received color image data in the form of RGB color data into luminance data and color difference data.

The color space converter 301 outputs the resultant luminance data and color difference data to the density generator 306. Furthermore, the color space converter 301 outputs the color difference data to the block divider 302.

Block Divider 302

The block divider 302 operates in a similar manner to the block divider 102 shown in FIG. 1, and thus a further detailed explanation thereof is omitted.

Representative Value Extractor 303

The representative value extractor 303 operates in a similar manner to the representative value extractor 103 shown in FIG. 1, and thus a further detailed explanation thereof is omitted.

Encoder 304

The encoder 304 converts the set of representative values (and coordinate values corresponding to the representative values) received from the representative value extractor 303 into digital watermark image data in the form of density components. The produced digital watermark image data in the form of density components is output to the combiner 305.

In the case of the image processing apparatus shown in FIG. 1, the encoder 104 is configured to produce multilevel CMYK color density data. In contrast, in the image processing apparatus shown in FIG. 3, CMYK color density data is produced in a binary form. This is because the binarization unit of the image processing apparatus shown in FIG. 3 is located at a stage before the combiner. In general, the digital watermark is produced in a binary form. However, in a case where the digital watermark is output to a unit that processes data in a state in which the data is not yet binarized, the data takes a value in the range from 0 to 255. On the other hand, in a case where data is output to a unit that processes binarized data, the data takes a value of 0 or 1. Thus, there is no influence on the processing load on the encoder 304.

Density Generator 306

The density generator 306 is similar to the density generator 105 except for the following two points. A first difference is that density generator 306 receives the luminance data and the color difference data not from the color space converter 101 but from the color space converter 301. A second difference is that the density generator 306 sends the CMYK data not to the combiner 106 but to the binarization unit 307.

Binarization Unit 307

The binarization unit 307 converts the color density data received from the density generator 308 into binary luminance data of density components with reduced information content (for example, 1-bit binary data) that can be treated by the printing apparatus in printing. The produced binary luminance data is output to the combiner 305.

Combiner 305

The combiner 305 receives the binary luminance data representing color density components from the binarization unit 307 and the binary digital watermark image data of density components (one or more of C/M/Y/K density components) from the encoder 304, and the combiner 305 combines the received data while maintaining the form of density components thereby obtaining binary combined data of density components. The combiner 305 outputs the resultant binary combined data of density components to the printing apparatus.

In the image processing apparatus in which the binarization unit 307 is located at a stage before the combiner 305, as is the case with the image processing apparatus shown in FIG. 3, it is possible to reduce the area over which the binarization unit performs a binarization process. Therefore, in many cases such as when digital watermark image is printed on a next page, it is possible to reduce the processing load compared with the image processing apparatus shown in FIG. 1.

Figure 4:
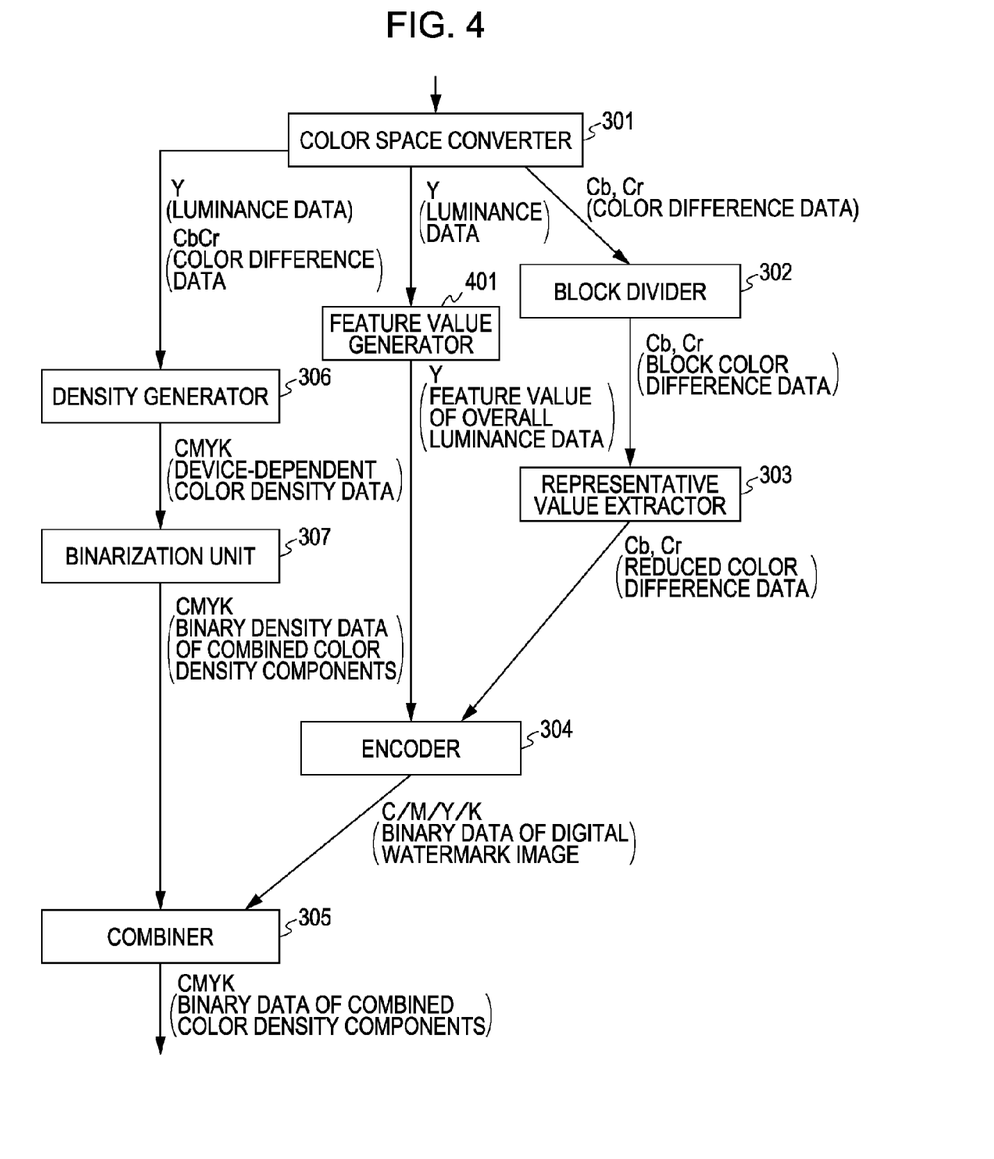
FIG. 4 is a diagram illustrating an image processing apparatus including a feature value generator.

FIG. 4 is a diagram illustrating an image processing apparatus including a feature value generator. In the case of the image processing apparatus shown in FIG. 3, the encoder 304 receives only the reduced-size color difference data output from the representative value extractor 303 but does not receive luminance data from the color space converter 301.

In contrast, in the image processing apparatus shown in FIG. 4, the encoder 304 additionally receives the feature values of the overall luminance data from the color space converter 301 via a feature value generator 401, wherein the feature values are produced in a form with a very small data size from the luminance data.

In the following explanation of the image processing apparatus shown in FIG. 4, the explanation will focus on the color space converter 301, the feature value generator 401, and the encoder 304 which operate in differently from those of the image processing apparatus shown in FIG. 3.

Process Performed by Color Space Converter 301

The color space converter 301 in FIG. 4 performs, in addition to the process performed by the color space converter 301 shown in FIG. 3, a process of providing luminance data to the feature value generator 401.

Process Performed by Feature Value Generator 401

The feature value generator 401 shown in FIG. 4, as with the feature value generator 201 shown in FIG. 2, extracts the feature values of the entire received luminance data.

Process Performed by Encoder 304

The encoder 304 produces digital watermark image data from the set of the representative values (and coordinate values corresponding to the respective representative values) received from the representative value extractor 303 and the feature values received from the feature value generator 401.

As described above, unlike the image processing apparatus shown in FIG. 3, the image processing apparatus shown in FIG. 4 produces the digital watermark image data so as to include not only reduced-size color difference data but also the feature values of the entire luminance data.

By producing the digital watermark image data so as to include the feature values, as is the case with the image processing apparatus shown in FIG. 4, it becomes possible to obtain color image data more similar to the original color image data in the reconstruction process than can be by the image processing apparatus shown in FIG. 3.

Furthermore, unlike the digital watermark image data produced by the image processing apparatus shown in FIG. 3, the digital watermark image data produced by the image processing apparatus shown in FIG. 4 includes the feature values of the luminance data in addition to the color difference data. Because the feature values of the luminance data are data with a data size reduced at a very great ratio, the total data size of the digital watermark image data can still be very small.

Reconstructing Color Image from Color Image Including Color Difference Data in the Form of Digital Watermark Image Data Next, an explanation is given of a printing system configured to reconstruct color image data from the color printed matter described above. The printing system includes a reading apparatus, an image processing apparatus, and a printing apparatus.

The reading apparatus reads a printed matter and produces RGB image data. The produced RGB image data is output to the image processing apparatus.

The image processing apparatus performs image processing on the RGB image data received from the reading apparatus. Color image data obtained as a result of the image processing is output to a display apparatus.

The display apparatus may be included in the printing system described above, or may be included in another different system.

Figure 7:
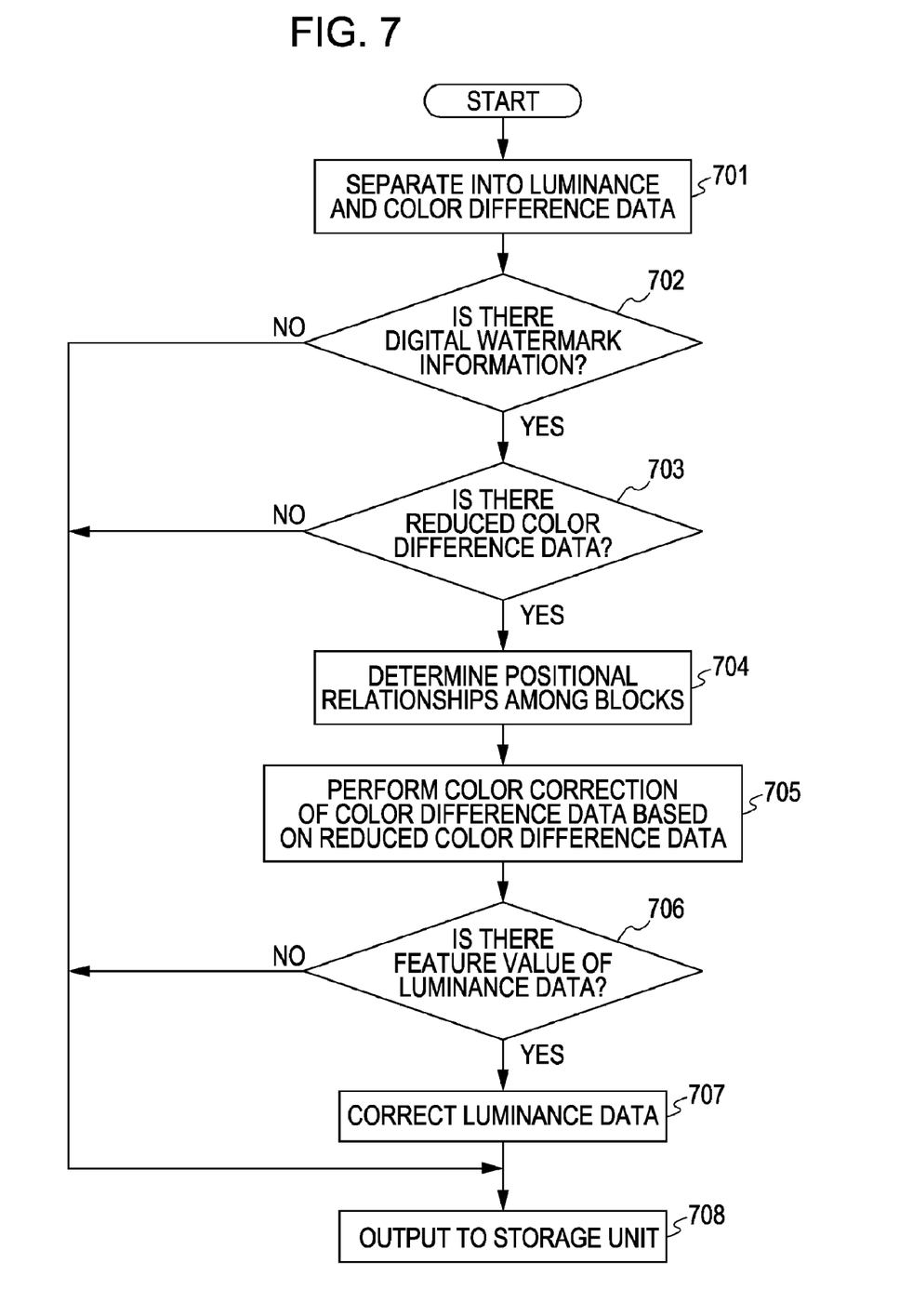
FIG. 7 is a flow chart illustrating a reconstruction process.

Referring to FIG. 7, a further detailed explanation is given as to the image processing apparatus adapted to output a color image on a display in accordance with RGB color image data produced by a reading apparatus.

Processes performed in respective steps shown in FIG. 7 are centrally controlled by a CPU disposed in the image processing apparatus. Programs that define processes to be performed in the respective steps are retained in the image processing apparatus in such a manner that the programs are stored in a storage medium (such as an HDD, a flash memory, a CD-ROM disk, a DVD disk, etc.) in the image processing apparatus. The CPU sequentially reads the programs stored in the storage medium and executes the processes in the respective steps.

FIG. 7 is a flow chart illustrating a process performed by the image processing apparatus in the present printing system. The image processing apparatus is centrally controlled by a CPU disposed in the image processing apparatus.

That is, the process in each step is executed by the CPU.

In step 701, the RGB image data received from the reading apparatus is separated into luminance data and color difference data.

In step 702, a determination is made as to whether the luminance data includes digital watermark image data. If there is no digital watermark image data, the process proceeds to step 708, to supply the luminance data and the color difference data to the storage unit. In a case where there is digital watermark image data, the process proceeds to step 703.

In step 703, a determination is made as to whether it is possible to decode the digital watermark image data into the form of reduced-size color difference data (a set of representative values of color difference data of respective blocks and coordinate values corresponding to the respective representative values). If a result of the determination is that no reduced-size color difference data can be obtained, the process proceeds to step 708. In step 708, the luminance data and the color difference data are output to the storage unit.

In step 704, a block (including 16×16 pixels) of the color difference data obtained in step 701 is detected, to which the coordinate values (corresponding to each representative value of the color difference data) in the reduced-size color difference data correspond to, sequentially for the respective coordinate values. In other words, adjustments are sequentially performed so that the blocks of color difference data obtained in step 701 have a one-to-one correspondence to the blocks of color difference data included in the digital watermark image data. In the present embodiment, when the correspondence is determined, effects of skewing occurring during a printing or reading operation are first corrected, and then positional relationships are sequentially determined. In the present embodiment, the color difference data obtained in step 701 is referred to as color difference data of read image data.

In step 705, the representative value (DC component) is determined for each block in the color difference data obtained in step 701, and the representative value is corrected using the reduced-size color difference data.

Figure 12:
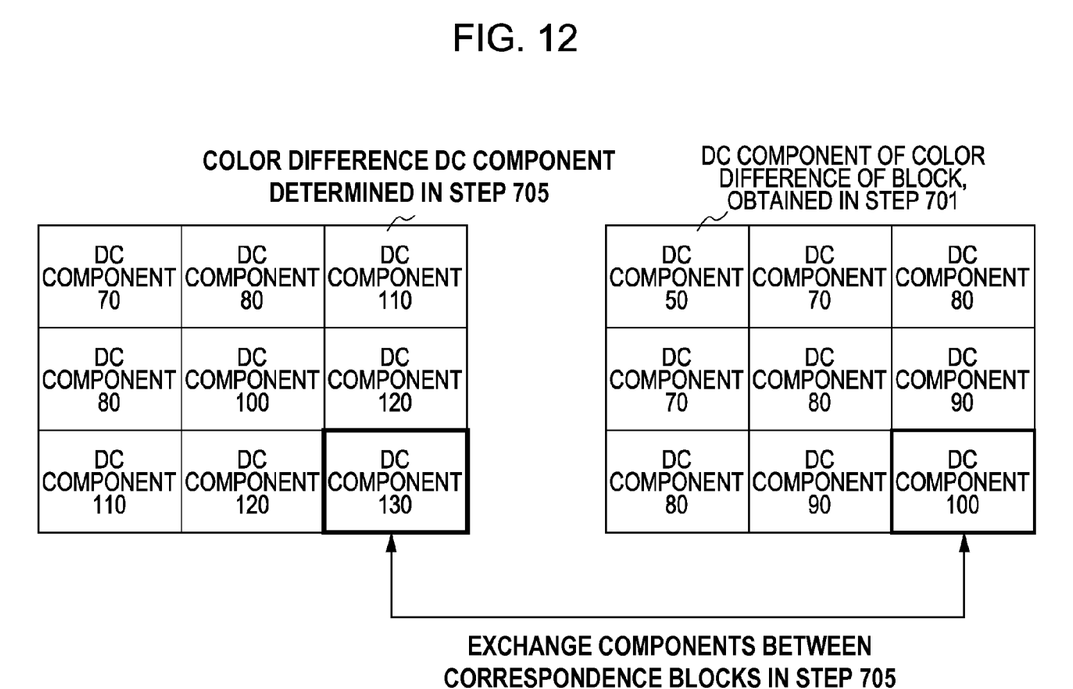
FIG. 12 is a diagram conceptually illustrating a process of exchanging representative values of color difference components.

Referring to FIG. 12, an example of a correction method is described below. The reduced-size color difference data of blocks is given by a set of representative values extracted in step 103 in FIG. 1 or in step 303 in FIG. 3 for respective blocks.

The representative value of each block in the color difference data of the read image data is replaced by the representative value of a corresponding block of the reduced-size color difference data. The replacing of data in this manner is one of methods to perform the correction.

In the present embodiment, as described above, the representative value is given by a DC component. Therefore, in step 705, information associated with a change in color difference between pixels in a block is not corrected, but only the representative value (DC component) of the color difference in the block is corrected.

The correction may be performed by addition as described below.

That is, the representative value of a block in color difference data is subtracted from the representative value of a corresponding block in reduced-size color difference data, and the result is added to each pixel in this block in the color difference data.

As a result of the correction process described above, reconstructed color image data (Y, Cb, Cr) is obtained.

In this step 705, as described above, color is reproduced for luminance data by using DC components corrected according to the reduced-size color difference data in the digital watermark image data. The use of the method described above makes it possible to correct the DC components (representative values) that are more susceptible to degradation than AC components when copying is performed, and thus it becomes possible to produce very beautiful reconstructed color image data similar to original color image data.

In step 706, a determination is made as to whether the digital watermark image data includes feature values of overall luminance data. If it is determined that the digital watermark image data does not include feature values of overall luminance data (this can occur in the case where the digital watermark image data is that produced by the image processing apparatus shown in FIG. 2 or 4), the process proceeds to step 708. On the other hand, in a case where the digital watermark image data includes feature values, the process proceeds to step 707 to correct the luminance data.

In step 707, the luminance data obtained in step 701 is corrected using feature values (for example, luminance values V1 and V2 (see FIG. 5) at upper and lower ends of the histogram of the Y channel) of the overall luminance data in the digital watermark image data.

This correction is performed to obtain the feature values of the luminance data obtained in step 701 (the luminance data obtained as a result of the scanning) equal to the feature values of the luminance data of the original color image data. A specific example of a correction formula is shown below, which can be used when the feature values of overall luminance data are given by V1 and V2.

$$V' = \frac{V_2(\text{origin}) - V_1(\text{origin})}{V_2(\text{scan}) - V_1(\text{scan})}V + \frac{V_1(\text{origin})V_2(\text{scan}) - V_1(\text{scan})V_2(\text{origin})}{V_2(\text{scan}) - V_1(\text{scan})} \quad (1)$$

where V1(origin) is V1 produced by the feature value generator 201 or the feature value generator 401, and V2(origin) is V2 produced by the feature value generator 201 or the feature value generator 401.

Note that in this step 707, before the luminance data obtained in step 701 is corrected, the feature values (V1(scan) and V2(scan)) of the luminance data obtained in step 701 are determined.

More specifically, the feature values (V1(scan) and V2(scan)) of the luminance data obtained in step 701 are determined according to the procedure described below.

First, a histogram is produced from the luminance data obtained in step 701 (the luminance data obtained as a result of the scanning).

A smallest value of the produced histogram excluding noise is employed as V1(scan), and a greatest value of the produced histogram excluding noise is employed as V2(scan).

In formula (1), V is an uncorrected luminance value of each pixel of the luminance data obtained in step 701, and V' is a corrected luminance value of a corresponding pixel.

As a result of the above procedure, a set of V' (corrected luminance values of respective pixels) is obtained as corrected luminance data.

In step 708, the reconstructed color image data (Y, Cb, Cr) is output to the storage unit.

As a result of the above process, color image data very similar to the original color image data is reconstructed using the color difference data in the color image data.

Finally, the reconstructed color image data is read from the storage unit and converted into RGB components by using the profile or the like, and the resultant RGB components are output to the display apparatus.

By performing the process described above, it is possible to reconstruct color image data similar to original image data from the digital watermark image data with a small size on a color printed matter and luminance data and color difference data on this color printed matter.

Second Embodiment

In the first embodiment described above, the correspondence between the reduced-size color difference data and the color difference data obtained in step 701 is determined, and the color difference data of the read image data is corrected in step 705.

In other words, when the color difference data of each pixel in the predetermined-size block is determined, the correction is performed by using only DC components of the information included in the digital watermark image representing the color difference data of respective predetermined-size blocks.

In a second embodiment described below, the color difference data of each pixel in the predetermined-size block of interest is determined not only using the color difference data of the predetermined-size block of interest but also using the color difference data of neighboring blocks surrounding the predetermined-size block of interest.

In the present embodiment, the term "wide area" is used to describe an area including a predetermined-size block of interest to which a pixel of interest belongs and neighboring blocks surrounding the predetermined-size block of interest. In the present embodiment, the "wide area" includes 3×3 blocks, where each block includes 16×16 pixels.

That is, in the present embodiment, the color difference data of each pixel included in the predetermined-size block is determined also taking into account the color difference data of the wide area.

When the color difference data of a particular pixel included in a particular predetermined-size block is determined, a problem can occur if only the information included in the digital watermark image representing the color difference data of the particular predetermined-size block is used. This problem and a method of avoiding the problem are discussed below.

Figure 10:
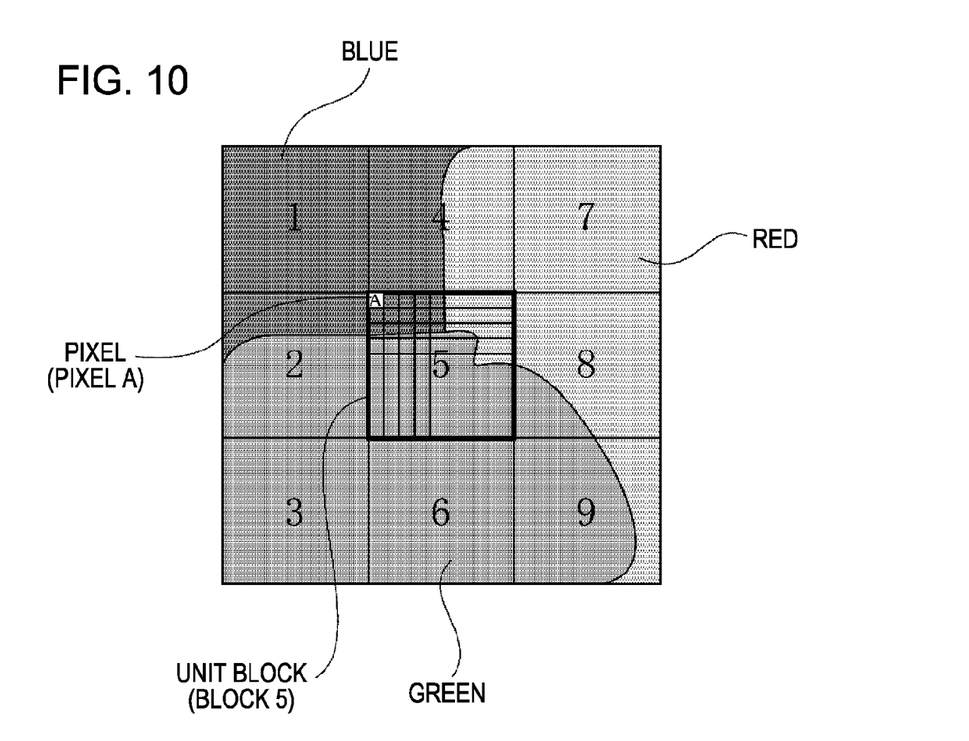
FIG. 10 is a diagram conceptually illustrating an advantage achieved by using a representative value of a wide area in reconstruction.

FIG. 10 illustrates a part (3×3 blocks) of an image divided into blocks. Herein, one block includes 16×16 pixels. It is assumed that the partial image shown in FIG. 10 is composed of three colors, i.e., red, green, and blue, and each pixel has luminance data and color difference data. It is also assumed that component colors, i.e., red, green, and blue, have equal luminance and color differences for pixels each indicating read, green, or blue.

It can be seen from FIG. 10 that when a unit block includes a boundary at which a color changes, it is desirable that the representative value used to determine the color of each pixel be determined not only on the basis of the block to which the pixel belongs but also on the basis of the wide area.

In the example shown in FIG. 10, a block 5 has boundaries between three colors, red, green, and blue. If the method according to the first embodiment described above is applied to a block having a color boundary, unit block noise can occur. Ideally, a color change occurs at a boundary or an edge formed by a set of pixels. However, in the first embodiment described above, a color change can occur only in units of predetermined-size blocks. Besides, for a block including a color boundary, the representative value thereof is given by a mixture of a plurality of different color values, there is a possibility that a good result cannot be obtained in the determination of the color of pixels if the representative value is used for all pixels in the block.

For example, when the color for a pixel A (blue) in FIG. 10 is determined, it is better to determine the color using the representative value (average value) of a block 1 than the representative value (average value) of the block 5 to which the pixel A belongs.

As can be understood from the above discussion, the color determination using only a block to which a pixel belongs has the problem described above, and the use of the wide area can effectively avoid the problem.

Figure 11:
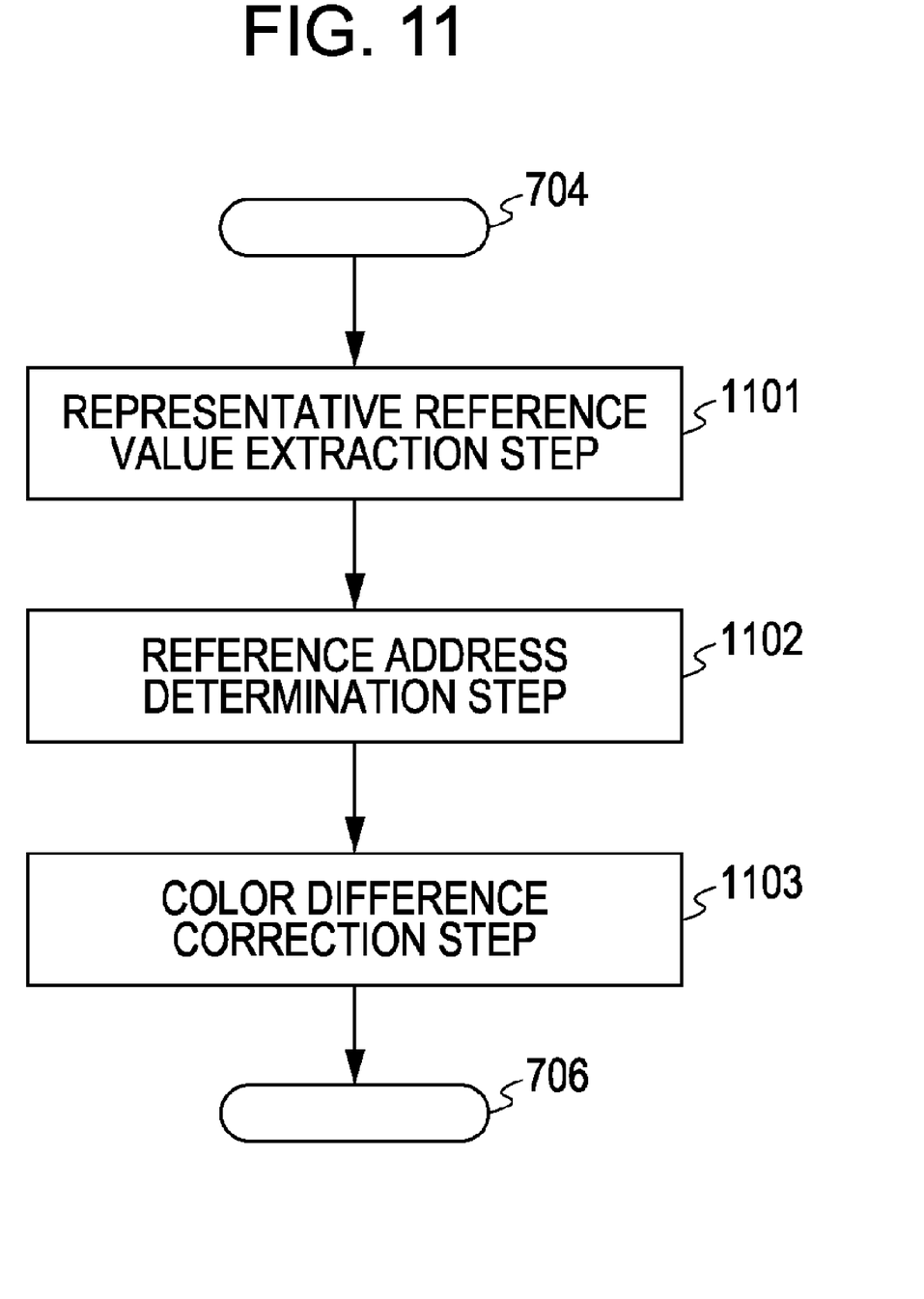
FIG. 11 is a flow chart illustrating a reconstruction process using a wide area.

More specifically, to perform the color determination using the wide area, step 705 is performed as described below with reference to FIG. 11.

Extraction of Reference representative Value in Step 1101

In step 1101, a reference representative value is extracted as follows. That is, a set of pixels (16×16 pixels) in the read image data is employed as block color difference data, and a representative value is extracted from each block of block color difference data, for use in a later process.

Reference Address Determination in Step 1102

In step 1102, a reference address is determined as follows. That is, the color difference of each pixel in the block color difference data is compared with the representative value (of the block color difference data) of each block of a wide area including a block to which the pixel belongs. More specifically, for example, for the pixel A shown in FIG. 10, the block to which this pixel belongs is the block 5, and the wide area including the block to which the pixel belongs is the area including blocks 1 to 9. Thus, the blocks included in the wide area including the block to which the pixel belongs are blocks 1 to 9.

In a wide area including a unit block to which a pixel of interest belongs, a block having a representative value with a smallest difference from the color difference value of the pixel of interest is determined for each pixel, and the coordinates of the determined block are employed as a reference address.

In the present embodiment, the difference is ΔS given by the following formula.

$$\Delta S = \sqrt{(Cb_1 - Cb_2)^2 + (Cr_1 - Cr_2)^2} \quad (2)$$

Alternatively, instead of ΔS, the difference described above may be Δθ given by the following formula.

$$\Delta \theta: \quad (3)$$
$$vec1 = (Cb_1, Cr_1)$$
$$vec2 = (Cb_2, Cr_2)$$
$$\cos\Delta\theta = (vec1 \cdot vec2)/(|vec1| * |vec2|)$$
$$\Delta\theta = \arccos(\cos\Delta\theta)$$

Still alternatively, the difference described above may be a value given as a function of Δθ and ΔS (for example, a value which decreases with both decreasing Δθ and ΔS, such as the sum of the square of Δθ and the square of ΔS, or the sum of Δθ and ΔS).

In formula (2) and (3), Cb1 and Cr1 denote color difference values of a pixel of interest, and Cb2 and Cr2 denote representative values of a block (for example, a block 1) under evaluation in a wide area including a block to which the pixel of interest belongs.

In the present example, the pixel A is blue, and thus the smallest difference is obtained when the blocks whose representative value is blue is selected from the blocks 1 to 9 of the wide area including the block to which the pixel A belongs.

Color Difference Correction in Step 1102

Hereinafter, if the difference between the color difference value of a pixel of interest and the representative value of a block of a wide area including a block to which the pixel of interest belongs has a minimum value when a particular block of the wide area is selected, then this particular block is referred to as a minimum-difference block. In the present example, the block 1 is the minimum-difference block.

In step 1102, the color difference is corrected as follows. That is, the representative value of color difference values of the minimum-difference block in the reduced-size color difference data (included in the digital watermark image data) is subtracted from the representative value of the minimum-difference block in the read image data for each pixel, and the result is added to the color difference value of the pixel.

For example, the difference between the average value of color difference values in the block 1 in the read image data and the average value of color difference values of the block 1 in the digital watermark image data is calculated, and the result is added to the color difference value of the pixel A. Note that the difference between the average value of color difference values in the block 1 in the read image data and the average value of color difference values of the block 1 in the digital watermark image data indicates a degree to which degradation occurs in an image when printing or copying is performed. In other words, in the present embodiment, the addition process in this step is performed to compensate for the degradation.

Note that in the present embodiment, to estimate the image degradation degree caused by printing or copying, the minimum-difference block is determined. For example, the degradation degree in the color difference of the pixel A is closer to that of the block 1 than the other regions (the regions 2 to 9).

By performing the process described above for all pixels in the read image data, reconstructed color image data (Y, Cb, Cr) is produced.

Other Embodiments

The present invention may be applied to a system including a plurality of apparatuses (such as a computer, an interface device, a reader, a printer, etc.) or a single apparatus (such as a multifunction apparatus, a printer, a facsimile machine, etc.).

One or more of functions according to one of or a mixture of the embodiments described above may be implemented by loading a program code from a medium onto a computer (or a CPU or an MPU) of a system or an apparatus, and executing the program on the computer. In this case, the program code read from the storage medium implements the functions disclosed in the embodiments described above, and the program code and the storage medium on which the program code is stored fall within the scope of the present invention.

As for the storage medium for supplying the program code, for example, a floppy disk, an HDD, an optical disk, a magneto-optical disk, a CD-ROM disk, a CD-R disk, a magnetic tape, a nonvolatile memory card, a ROM or the like may be used.

Implementation of one or more functions according to one of or a mixture of above-described embodiments by executing the program code on a computer also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-198949 filed Jul. 31, 2007, which is hereby incorporated by reference herein in its entirety.

What is claimed is:

1. An image forming apparatus configured to process RGB image data, comprising:
   a separating unit configured to separate the RGB image data into luminance data and color difference data;
   a calculating unit configured to calculate a lowest value and a highest value of the luminance data excluding noise,
   an extracting unit configured to extract representative values of respective blocks from the color difference data;
   a first producing unit configured to produce digital watermark image data from both the extracted representative values of the respective blocks from the color difference data and the calculated lowest value and the highest value of the luminance data excluding noise; and
   a second producing unit configured to produce a printed matter from the RGB image data and the digital watermark image data, wherein the RGB image data included in read image data obtained by reading a printed result is corrected according to the digital watermark image data included in the read image data.

2. A method for an image forming apparatus to process RGB image data, comprising:
   separating the RGB image data into luminance data and color difference data;
   calculating a lowest value and a highest value of the luminance data excluding noise,
   extracting representative values of respective blocks from the color difference data;
   producing digital watermark image data from both the extracted representative values of the respective blocks from the color difference data and the calculated lowest value and the highest value of the luminance data excluding noise; and
   producing a printed matter from the RGB image data and the digital watermark image data, wherein the RGB image data included in read image data obtained by reading a printed result is corrected according to the digital watermark image data included in the read image data.

3. A computer readable non-transitory storage medium having instructions that, when executed by a processor, cause the processor to perform operations comprising:
   separating RGB image data into luminance data and color difference data;
   calculating a lowest value and a highest value of the luminance data excluding noise,
   extracting representative values of respective blocks from the color difference data;
   producing digital watermark image data from both the extracted representative values of the respective blocks from the color difference data and the calculated lowest value and the highest value of the luminance data excluding noise; and
   producing a printed matter from the RGB image data and the digital watermark image data, wherein the RGB image data included in read image data obtained by reading a printed result is corrected according to the digital watermark image data included in the read image data.

* * * * *